US008238944B2

(12) United States Patent
Neumann

(10) Patent No.: US 8,238,944 B2
(45) Date of Patent: Aug. 7, 2012

(54) DISASTER AND EMERGENCY MODE FOR MOBILE RADIO PHONES

(75) Inventor: Peter Neumann, München (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 163 days.

(21) Appl. No.: 10/511,457

(22) PCT Filed: Apr. 6, 2002

(86) PCT No.: PCT/EP02/04214
§ 371 (c)(1),
(2), (4) Date: Oct. 15, 2004

(87) PCT Pub. No.: WO03/088700
PCT Pub. Date: Oct. 23, 2003

(65) Prior Publication Data
US 2005/0119016 A1    Jun. 2, 2005

(51) Int. Cl.
*H04W 68/00* (2009.01)
*H04L 9/32* (2006.01)
(52) U.S. Cl. .................. 455/458; 455/412.2; 713/170
(58) Field of Classification Search ............. 455/404.1, 455/66, 445, 466, 521, 414.4, 564, 436, 518, 455/404.2, 453, 404, 558, 458, 13.4, 33.1, 455/422.1; 370/349, 352, 312, 364; 713/170
See application file for complete search history.

(56) References Cited

U.S. PATENT DOCUMENTS

| | | | | |
|---|---|---|---|---|
| 5,301,359 A * | 4/1994 | Van den Heuvel et al. ... | 455/524 |
| 5,335,350 A * | 8/1994 | Felderman et al. ............ | 455/17 |
| 5,630,209 A * | 5/1997 | Wizgall et al. ................ | 455/521 |
| 5,995,825 A * | 11/1999 | Hietalahti .................... | 455/414.4 |
| 6,115,596 A * | 9/2000 | Raith et al. ................... | 455/404.2 |
| 6,138,038 A * | 10/2000 | Huotari ......................... | 455/564 |
| 6,161,016 A * | 12/2000 | Yarwood ....................... | 455/445 |
| 6,249,681 B1 * | 6/2001 | Virtanen ....................... | 455/466 |
| 6,289,211 B1 * | 9/2001 | Koorapaty et al. ........ | 455/404.2 |
| 6,351,647 B1 * | 2/2002 | Gustafsson .................. | 455/466 |
| 6,356,767 B2 * | 3/2002 | Froula .......................... | 455/512 |
| 6,370,391 B1 * | 4/2002 | Lietsalmi et al. ............. | 455/466 |
| 6,374,099 B1 * | 4/2002 | Bi et al. ....................... | 455/404.1 |
| 6,397,054 B1 * | 5/2002 | Hoirup et al. ................ | 455/404.1 |
| 6,516,200 B1 * | 2/2003 | Schmidt et al. .............. | 455/518 |
| 6,636,732 B1 * | 10/2003 | Boling et al. ................ | 455/404.1 |
| 7,809,350 B2 * | 10/2010 | Buckley et al. ............. | 455/404.1 |
| 2002/0019241 A1 * | 2/2002 | Vialen et al. ................. | 455/458 |
| 2002/0068527 A1 * | 6/2002 | Massingill et al. .......... | 455/13.4 |
| 2002/0068566 A1 * | 6/2002 | Ohlsson et al. .............. | 455/436 |
| 2002/0131397 A1 * | 9/2002 | Patel et al. ................... | 370/349 |
| 2002/0173316 A1 * | 11/2002 | Jang et al. .................... | 455/453 |
| 2003/0172272 A1 * | 9/2003 | Ehlers et al. ................. | 713/170 |
| 2004/0081139 A1 * | 4/2004 | Beckmann et al. ........... | 370/352 |
| 2004/0242246 A1 * | 12/2004 | Lee et al. ..................... | 455/466 |
| 2006/0217153 A1 * | 9/2006 | Coles et al. .................. | 455/558 |

FOREIGN PATENT DOCUMENTS

DE    198 06 969       9/1999
WO    WO 94/28687     12/1994

* cited by examiner

*Primary Examiner* — Kiet Doan

(57) ABSTRACT

A method and device are provided for allowing an efficient control of the establishment of connections of mobile radio phones that are present in an area hit by a disaster. According to the present invention, a sequence is transmitted in a single broadcast to all mobile stations in at least one cell of a mobile radio network present in the respective area. According to the sequence, a connection to a mobile station in the area is only established if the mobile station requesting establishment of the connection communicates the sequence when requesting establishment of the connection.

14 Claims, 1 Drawing Sheet

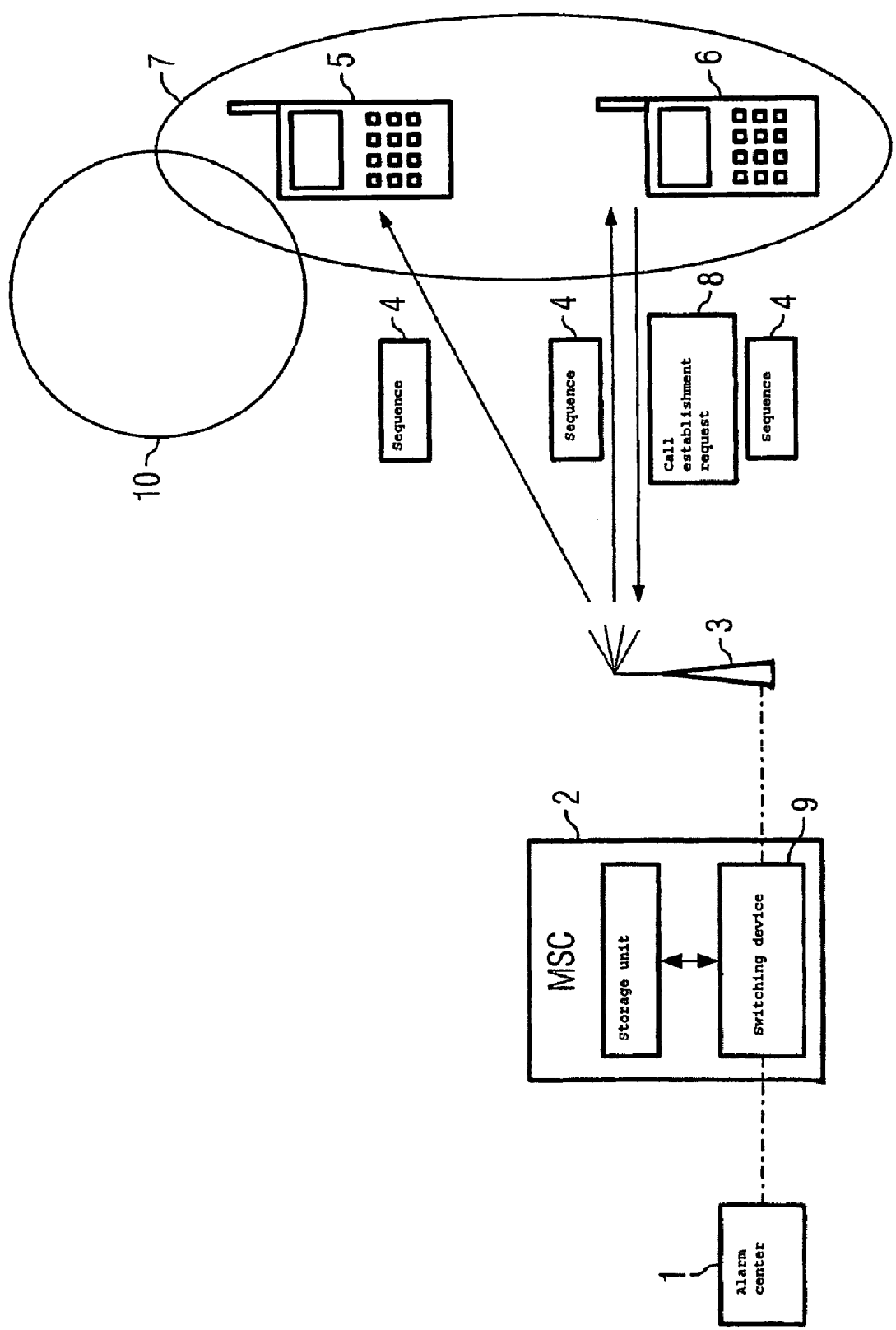

DISASTER AND EMERGENCY MODE FOR MOBILE RADIO PHONES

BACKGROUND OF THE INVENTION

The present invention relates to methods and devices for controlling the establishment of connections to mobile stations present in an area hit by a disaster.

In a disaster, experience has shown that mobile radio networks in the area hit by the disaster are frequently overloaded, as users of many mobile stations present in this area try to make emergency calls.

It is known from WO 94/28687 A1 that the same message (for example, relating to the disaster) can be transmitted simultaneously to all mobile stations in an area hit by a disaster through broadcast from an alarm center, for which purpose the mobile stations in the area in question can be switched to inactive with the effect that ongoing calls are interrupted and new calls cannot be made.

An object of the present invention is therefore, to allow mobile stations to establish a connection with the most effective regulation possible avoiding overloading of the voice connection channels present in an area hit by a disaster.

SUMMARY OF THE INVENTION

Since, according to the present invention, a sequence is transmitted via a cell broadcast (e.g., SMS-CB in GSM, etc.) to all mobile stations in at least one cell in the area in question, through which sequence a mobile station can request the establishment of a connection (in particular, a voice connection) to a destination address, it is possible to control the establishment of connections to the mobile stations in the area while still avoiding network overload. The cell broadcast can be in the form of a short message, for example. Alternatively or additionally, it is also possible to inform all the mobile stations present in the area ergonomically about the circumstances of the disaster via a circuit switched group call function (line-based transmission of voice information to all mobile stations in the group in at least one cell).

In particular, it is possible to control the mobile stations (mobile telephones) by activating their SIM application toolkit function (if this exists in the SIM card of the mobile station), to control the mobile stations efficiently so that, for example, they themselves cannot activate calls or can only activate calls to predefined numbers, and/or that they communicate a mobile radio terminal number or mobile radio subscriber ID card number to an emergency center (the address of which can, for example, be transmitted beforehand with the ID).

According to one embodiment of the present invention, mobile stations are enabled during a disaster to call a number provided for this purposes as destination, which telephone number can, for example, be made up of the sequence and the mobile station device number, to allow identification of the individual mobile radio terminal during the call in an efficient manner.

In order to detect all subscribers in the disaster area in a similarly efficient manner, the mobile stations can be prompted to transmit their mobile radio terminal number (IMEI) and/or the mobile radio subscriber ID card number (IMSI/MSISDN) of data representing the mobile radio subscriber ID card (SIM) contained in the mobile station to a predefined telephone number (e.g. by SMS, CLIP, etc.).

Additional features and advantages of the present invention are described in, and will be apparent from, the following Detailed Description of the Invention and the Figures.

BRIEF DESCRIPTION OF THE FIGURES

FIG. 1 shows a schematic illustration of the control of the establishment of connections from mobile stations present in an area hit by a disaster.

DETAILED DESCRIPTION OF THE FIGURES

FIG. 1 shows an alarm center 1 which, in a disaster, prompts a switching device (MSC) 2 to transmit a cell broadcast (by SMS, etc.) via a mobile radio network indicated by a base station 3 to all mobile stations 5, 6 in at least one mobile radio cell of a mobile radio network 3, 7, 8 in the area 7, 8 hit by the disaster. The message 4 prompts the mobile stations 5, 6 to request the establishment of a connection (wanted by the user of the mobile station or serving to identify all the mobile stations present in the area 7, 8) in the future by specifying the sequence (as an SMS or part of a telephone number to be called) in a request (8).

The sequence can, for example, be any numerical number or letter sequence, etc. When transmitting a sequence 4, details of the disaster also can be transmitted to mobile radio terminals 5, 6 as text (SMS, etc.) or a voice message, etc.

In the case of a request 8 (by a mobile station 6) for establishment of a call via the mobile radio network 3 to a switching device (2, 9), where the call establishment request 8 does not contain the sequence (4) (and cannot subsequently transmit it), establishment of a call is rejected by the switching device 2, 9, to prevent overloading of the mobile radio network during the disaster by controlling connection establishment 8 in this way. In the case of a request 8 to establish a call from a mobile station 6 via the mobile radio network 3 to a switching device (2, 9), where the call establishment request 8 contains the sequence (4) (or can transmit it subsequently), the switching device 2, 9 establishes the call. Preferably, however, the connection is only established if the called destination (telephone number, etc.) is also a destination which is known to the switching device or previously communicated by an emergency center, for example.

A mobile station 6 tries, such as, after communication of the sequence 4, to establish a connection (in particular, a voice connection) to a destination (e.g., an operator telephone number of an alarm center (1)), by calling a telephone number made up for this purpose of the previously communicated sequence 4 and, in some instances, data in its MSISDN, whereby a switching device 9 in the MSC 2 ascertains that the sequence 4 was transmitted as authorization data (giving entitlement to a call) in this telephone number, whereupon the mobile station 6 is switched through to the called destination (operator, etc.) in the alarm center 1. Alternatively or additionally, such as via a SIM application toolkit of a mobile station, transmission of the sequence 4 (as proof of entitlement) can also prompt the mobile stations 6 independently to establish a voice connection or send a text message, which transmits identification of the mobile station 6 and/or data enabling the sequence 4 (for example, the mobile station terminal number IMEI, a mobile radio subscriber ID card number of a SIM in the mobile station 6, etc.).

When the disaster is over, the mobile stations MS 5, 6 and switching devices MSC can be returned to normal status by a message specifically for this purpose, wherein the mobile stations can again call any destination without transmitting a sequence and the switching devices can switch these through again without verifying a sequence.

Although the present invention has been described with reference to specific embodiments, those of skill of the art will recognize that changes may be made thereto without departing from the spirit and scope of the present invention as set forth in the hereafter appended claims.

The invention claimed is:

1. A method for controlling establishment of connections to mobile stations present in an area, the method comprising:
   transmitting a sequence in a message sent to the mobile stations in at least one cell of a mobile radio network present in the area; and
   providing that a voice connection only be established from a mobile station in the area to a destination called by the mobile station when the mobile station requesting the voice connection establishment communicates the sequence, and
   a telephone number of a subscriber, which a mobile station may call during a disaster, consists of the sequence and at least one of at least part of a device number of the mobile station and a subscriber ID number of the mobile station.

2. The method for controlling establishment of connections to mobile stations as claimed in claim 1, the sequence transmitted as a cell broadcast short message.

3. The method for controlling establishment of connections of mobile stations as claimed in claim 1, the sequence transmitted as a circuit switched group call.

4. The method for controlling establishment of connections of mobile stations as claimed in claim 1, the transmission of the sequence accomplished via an SIM application toolkit of the mobile station, the SIM application toolkit prompting the mobile station to transmit data representing at least one of a telephone number of the mobile station and a terminal number of the mobile station to one of the mobile radio network and the destination.

5. The method for controlling establishment of connections of mobile stations as claimed in claim 1, further comprising scanning at least one of telephone numbers and mobile station device numbers of the mobile stations in the area to substantially ascertain which of the mobile stations are present in the area.

6. A switching device for controlling establishment of a connection to mobile stations present in an area, comprising:
   a transmitting apparatus for transmitting a sequence in a message sent to the mobile stations in at least one cell of a mobile radio network present in the area; and
   a receiving apparatus for receiving the sequence with a request for establishment of a voice connection to a destination from a mobile station in an area of a disaster, wherein the voice connection requested from the mobile station will be established to the destination when the mobile station can specify the sequence and the destination is identified by a telephone number comprising the sequence, and at least one of at least part of a device number of the mobile station and a subscriber ID number of the mobile station.

7. The switching device of claim 6, the sequence transmitted as a cell broadcast short message.

8. The switching device of claim 6, the sequence transmitted as a circuit switched group call.

9. The switching device of claim 6, comprising a scanning apparatus to scan for at least one of telephone numbers and mobile station device numbers of the mobile stations in the area to substantially ascertain which of the mobile stations are present in the area.

10. The switching device of claim 6, the transmitting apparatus transmitting the sequence accomplished via an SIM application toolkit of the mobile station, the SIM application toolkit prompting the mobile station to transmit data representing at least one of a telephone number of the mobile station and a terminal number of the mobile station to one of the mobile radio network and the destination.

11. A mobile station for controlling establishment of a connection from an area, comprising:
   a receiving apparatus for receiving, in an area of a disaster in which the mobile station is present, a sequence, wherein the sequence is received in a message sent to the mobile station in at least one cell of a mobile radio network present in the area; and
   a transmitting apparatus for transmitting the sequence with a request for establishment of a voice connection to a destination to the mobile radio network, wherein the voice connection will be established to the destination when the mobile station can specify the sequence and the destination is identified by a telephone number comprising the sequence, and at least one of at least part of a device number of the mobile station and a subscriber ID number of the mobile station.

12. The mobile station of claim 1, the sequence received as a cell broadcast short message.

13. The mobile station of claim 11, the sequence received as a circuit switched group call.

14. The mobile device of claim 11, the receiving apparatus receiving the sequence accomplished via an SIM application toolkit of the mobile station, the SIM application toolkit prompting the mobile station to transmit data representing at least one of a telephone number of the mobile station and a terminal number of the mobile station to one of the mobile radio network and the destination.

* * * * *